(12) United States Patent
Schaap

(10) Patent No.: US 8,887,852 B2
(45) Date of Patent: Nov. 18, 2014

(54) FOLDABLE SCOOTER

(75) Inventor: Antonius Bernardus Schaap, Hilversum (NL)

(73) Assignee: Trikelet B.V., Hilversum (NL)

( * ) Notice: Subject to any disclaimer, the term of this patent is extended or adjusted under 35 U.S.C. 154(b) by 0 days.

(21) Appl. No.: 13/979,827

(22) PCT Filed: Feb. 8, 2012

(86) PCT No.: PCT/NL2012/000012
§ 371 (c)(1),
(2), (4) Date: Jul. 15, 2013

(87) PCT Pub. No.: WO2012/108760
PCT Pub. Date: Aug. 16, 2012

(65) Prior Publication Data
US 2013/0306392 A1    Nov. 21, 2013

(30) Foreign Application Priority Data

Feb. 11, 2011   (NL) ..................................... 1038576

(51) Int. Cl.
| | | |
|---|---|---|
| *B62K 15/00* | (2006.01) | |
| *B62K 3/00* | (2006.01) | |
| *B62K 5/025* | (2013.01) | |
| *B62K 5/02* | (2013.01) | |

(52) U.S. Cl.
CPC ............... *B62K 15/006* (2013.01); *B62K 3/002* (2013.01); *B62K 5/025* (2013.01); *B62K 2015/005* (2013.01); *B62K 5/02* (2013.01); *B62K 15/008* (2013.01)
USPC ............................ 180/208; 280/278; 280/287

(58) Field of Classification Search
CPC .......... B62K 5/02; B62K 9/02; B62K 15/006; B62K 15/008; B62K 2015/001; B62K 2015/005; B62K 2202/00; B62D 61/08; B60D 2300/122; B62M 6/40; B62M 6/90
USPC ............ 180/208, 210, 220; 280/287, 639, 37, 280/38, 641, 87.05, 62, 278
See application file for complete search history.

(56) References Cited

U.S. PATENT DOCUMENTS

| | | | | |
|---|---|---|---|---|
| 3,513,926 | A * | 5/1970 | Paget, Jr. ........................ | 180/208 |
| 3,710,883 | A * | 1/1973 | Rizzo ............................. | 180/208 |
| 4,598,923 | A * | 7/1986 | Csizmadia .................... | 280/287 |
| 5,388,659 | A * | 2/1995 | Pepe ............................. | 180/219 |

(Continued)

FOREIGN PATENT DOCUMENTS

| | | | | |
|---|---|---|---|---|
| CN | 20071160527.0 A | | 12/2007 | |
| DE | 4212051 A1 * | | 9/1993 | ............. B62K 15/00 |

(Continued)

*Primary Examiner* — Faye M Fleming
*Assistant Examiner* — Laura Freedman
(74) *Attorney, Agent, or Firm* — Shewchuk IP Services, LLC; Jeffrey D. Shewchuk

(57) ABSTRACT

A foldable scooter has a first frame section hingedly connected to a second frame section and supported by front and rear wheels, and a locking organ for locking the foldable scooter in an unfolded state. Two longitudinally extending, spaced-apart shield elements extend upward from the second frame section. When folded, tops of the first and second frame sections face each other, with the at least one rear wheel between sides defined by the shield elements. The front wheel (s) is (are) steerable, but can be pivoted to a location at least partially between the sides defined by the shield elements.

13 Claims, 8 Drawing Sheets

(56) References Cited

U.S. PATENT DOCUMENTS

| | | | |
|---|---|---|---|
| 6,273,442 B1 * | 8/2001 | Fallon et al. | 280/287 |
| 6,390,483 B1 * | 5/2002 | Hsu et al. | 280/87.041 |
| 6,854,551 B2 * | 2/2005 | Wisecarver | 180/208 |
| 7,077,229 B2 * | 7/2006 | Lee | 180/220 |
| 7,210,548 B2 * | 5/2007 | Yonehana et al. | 180/68.5 |
| 7,299,115 B2 * | 11/2007 | Honda | 701/22 |
| 7,654,356 B2 * | 2/2010 | Wu | 180/208 |
| 7,832,517 B2 * | 11/2010 | Tsai | 180/220 |
| 7,837,206 B1 * | 11/2010 | Lee | 280/37 |
| 8,162,090 B2 * | 4/2012 | Atherton et al. | 180/208 |
| 8,201,837 B2 * | 6/2012 | Dweek | 280/30 |
| 8,465,033 B2 * | 6/2013 | Benarrouch | 280/87.05 |
| 8,636,293 B2 * | 1/2014 | Eliasson | 280/278 |
| 2003/0001351 A1 * | 1/2003 | Schauble et al. | 280/87.05 |
| 2005/0077097 A1 * | 4/2005 | Kosco et al. | 180/208 |
| 2010/0320717 A1 | 12/2010 | Huang | |
| 2012/0013103 A1 * | 1/2012 | Marion | 280/639 |

FOREIGN PATENT DOCUMENTS

| | | |
|---|---|---|
| FR | 2 822 794 A1 | 10/2002 |
| FR | 2 915 454 A1 | 4/2007 |
| GB | 2 119 324 A | 11/1983 |
| GB | 2 477 512 A | 8/2011 |
| JP | 2002 145157 A | 5/2002 |
| WO | 83/03232 A1 | 9/1983 |
| WO | 2007/128124 A1 | 11/2007 |
| WO | 2009/121832 A1 | 10/2009 |
| WO | 2010/136038 A1 | 12/2010 |

* cited by examiner

FOLDABLE SCOOTER

BACKGROUND OF THE INVENTION

The present invention relates to foldable scooter capable of being in a first, unfolded state for transporting a person and in a second, folded state, the foldable scooter comprising a frame, said frame having a base comprising a first face capable of serving as a footrest and a second face opposite of the first face, at least one rear wheel being provided at said second face of the base; the foldable scooter further comprising a steering organ and at least one front wheel attached to the steering organ.

Foldable scooters are more and more recognized as a convenient means of transport to and from stations of public service transportation such as trains and busses. They are also convenient for car drivers who may have to park relatively far from their destination. In a folded state, the foldable scooter can be transported by train etc. as an object of a relatively low volume, or stored in a car until use without taking up an excessive amount of space.

A disadvantage of known foldable scooters is that the wheels pick up dirt from the road, in particular if the road is wet. This dirt may then be transferred to clothes, the interior of the car etc., soiling of which is generally undesirable.

BRIEF SUMMARY OF THE INVENTION

The object of the present invention is to provide a foldable scooter that provides a reduced risk of soiling.

To this end, the scooter according to the preamble is characterized in that the frame comprises a first frame section comprising the footrest of the base, the first frame section being hingedly connected to a second frame section, the second frame section having a first face from which two longitudinally extending, spaced-apart shield elements extend, and the foldable scooter comprises a locking organ for locking the foldable scooter in the first unfolded state, wherein in the second, folded state the first face of the base is folded such that the first face of the first frame section faces the first face of the second frame section with the at least one rear wheel between sides defined by the shield elements, the at least one front wheel being pivoted about an axis that is parallel to the axis of rotation of a rear wheel such that the front wheel is at least partially between the sides defined by the shield elements.

Traditional foldable scooters are very long when folded, with the wheels sticking out. The foldable scooter according to the present invention is much shorter, which is a great convenience when storing the scooter. Furthermore, the at least one rear wheel is shielded by the shield elements which prevent said at least one rear wheel from soiling anything. The shield element preferably contributes to the structural integrity of the second frame section. It may for example be in the form of an arctuate bar, both ends being welded to the second frame section. More preferably the shields are shield walls, capable of forming a barrier to water. The steering organ will generally be collapsible, using any method known in the art. For example, a hinge may be used such as for the Brompton bike, or a telescopic steering organ. The term "substantially parallel" allows deviations from strictly parallel as long as it still allows the front wheel or front wheels to be received at least partially between the shield elements.

The state of the art discloses many scooters, in particular those of FR2822794, US2010320717, JP2002-145157 and WO2007-128124. They fold the other way around, that is, with the second face of the first frame section facing the second face of the second frame section.

According to a preferred embodiment, the shield elements are concave shield walls, their openings facing each other.

If a wet folded scooter is placed on its side, any water running from a rear wheel or base or dirt dropping off will be collected by one of the shield walls.

According to a favourable embodiment, at least one of the concave shield walls is provided with water-absorbing element.

This water-absorbing element, e.g. a cloth lining, will prevent water collected on a concave side wall from running down and possibly soiling a user. This is useful, for example, if the scooter has been transported in a wet condition in the overhead bin of a train. Taking the scooter from the overhead bin could result in a small stream of water falling on people or goods.

According to a preferred embodiment, the scooter has at least three wheels.

Such a scooter can stand upright in the unfolded state without a support.

According to a preferred embodiment, the number of rear wheels is two, and the number of front wheels is one.

Such a scooter has fine handling properties when riding it.

According to a preferred embodiment, the axis of rotation for rotating the front wheel extends between the two shield elements.

Thus the structural load-bearing capacity (strength) of the scooter is improved. The same goes for the stiffness of the scooter, improving its driving performance.

According to a preferred embodiment, the steering organ comprises a first steering section rotatably connected to a second steering section, said second steering section being provided with the at least one front wheel, and a locking organ for fixing the first steering section to the second steering section when the foldable scooter is in the first, unfolded state, the axis of rotation at the connection between the first steering section and the second steering section being farther away from the first face of the second frame section than the axis of rotation for pivoting the front wheel to the second, folded state.

This not only allows the steering organ front wheel with the second steering section to be folded between the shield elements, but also allows the first section of the steering organ to fold towards the first frame section, resulting in a very compact second, folded state of the scooter. The first steering section may be telescopic. With the axis of rotation between the first steering section and the second steering section being further away from the first face of the frame than the axis of rotation for pivoting the front wheel to the second folded state where the front wheel is at least partially between the sides defined by the shield elements, the front wheel can be moved to and from the second, folded state without the user having to touch the second steering section or the front wheel.

According to a preferred embodiment, the scooter comprises an electrical motor for driving at least one rear wheel.

Thus a person can move with little or no effort. The battery for the electrical motor may be mounted at the second face of the base. According to an interesting embodiment the shield elements comprise the batteries.

According to a preferred embodiment, a face of the second frame section facing away from the first face of the second frame section provided with the shield elements is provided with auxiliary wheels for moving the scooter in the second, folded state.

The auxiliary wheels allow for moving the scooter in the second, folded state in a convenient way, like a trolley. The auxiliary wheels are smaller than the rear and front wheels and do not contact the ground when the foldable scooter is in the first, unfolded state.

According to a preferred embodiment, in the second, folded state the at least one front wheel is completely between the shield elements.

Thus the risk of soiling by the front wheel is reduced even further.

According to a preferred embodiment, the number of rear wheels differs from the number of front wheels and none of the at least one rear wheel is in line with any of the at least one front wheels.

Front and rear wheels not being in line allows for a more compact state in the folded state of the scooter.

According to a favourable embodiment, the steering organ comprises a first steering section and a second steering section, the scooter comprising a second locking organ for releasably fixing the second steering section to the second frame section.

This provides a convenient manner of keeping the steering organ in a fixed state when the scooter is used in the first, unfolded state thereof.

According to a favourable embodiment, the steering organ comprises a first steering section and a second steering section, the first steering section comprising steering rods joined by a hinge, the front wheel of the second steering section being capable of passing between the steering rods.

This allows the user to conveniently pass the front wheel from the first, unfolded state to the second folded state. The hinge will at a greater distance from the first face of the second frame section than the axis of rotation parallel to the axis of rotation of a rear wheel.

BRIEF DESCRIPTION OF THE DRAWINGS

The present invention will now be illustrated with reference to the drawing where.

DETAILED DESCRIPTION OF THE PREFERRED EMBODIMENT(S) OF THE INVENTION

Figure 1:
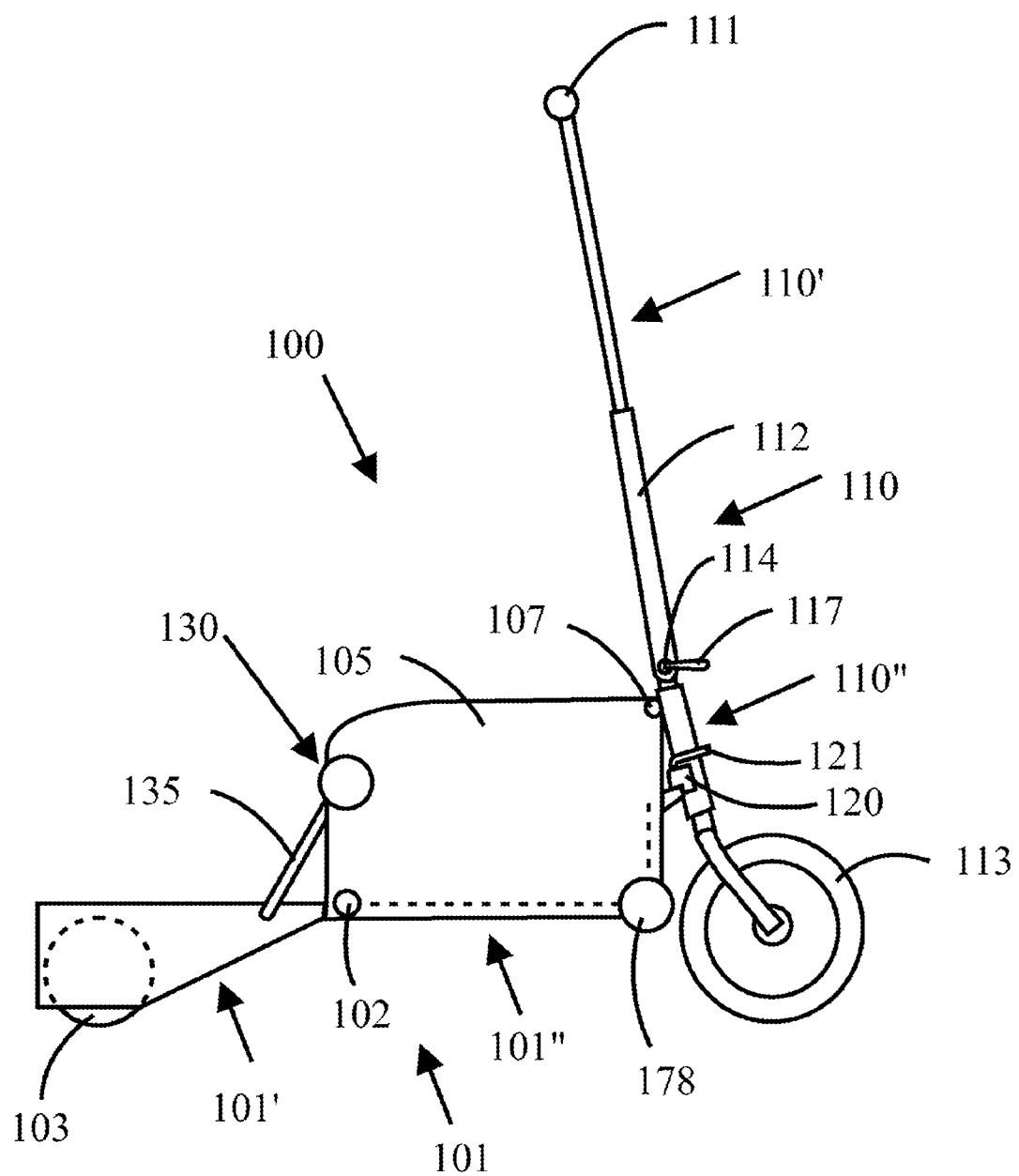
FIG. 1 represents a side view of a scooter according to the invention in a first, unfolded state.

FIG. 1 shows a side view of a scooter 100 according to the invention in a first, unfolded state, which allows it to be used to ride from one location to another. The scooter 100 comprises a frame 101 comprising a first frame section 101' and a second frame section 101", the first frame section 101' and the second frame section 101" being joined by a hinge 102. When the scooter 100 is used, a user will stand on a first face (here the top side) of the first frame section 101'. At a second face (here the bottom side) of the first frame section 101' two rear wheels 103 are provided. Auxiliary wheels 178 will be discussed with reference to FIG. 3 and FIG. 8.

Figure 2:
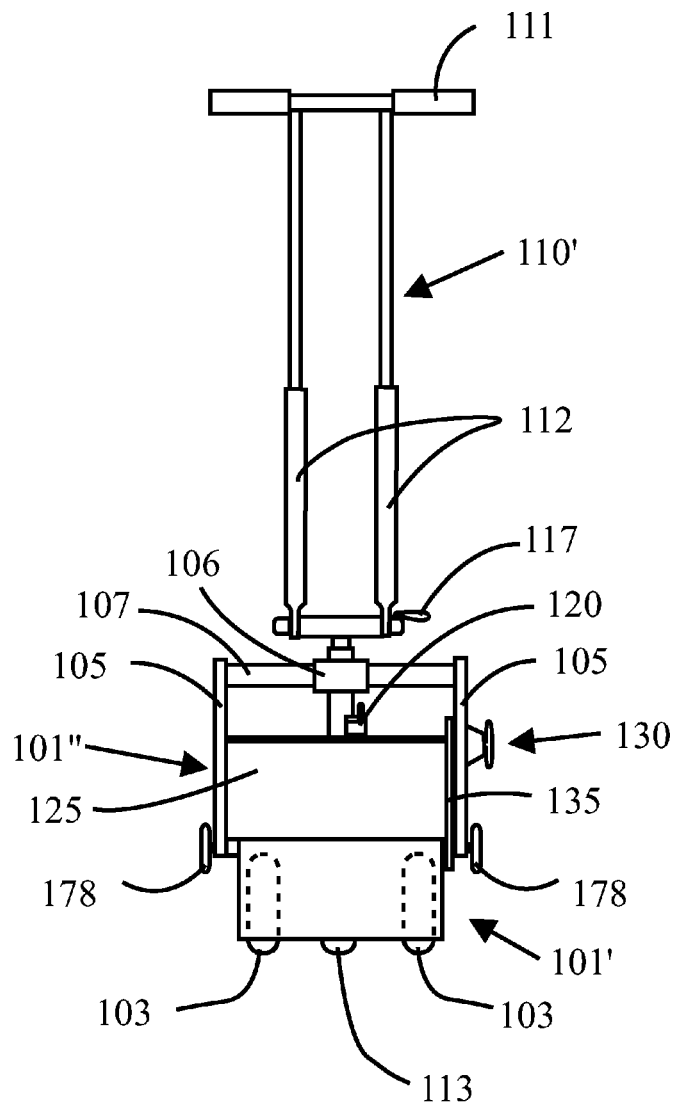
FIG. 2 represents a rear view of the scooter of FIG. 1 in the first, unfolded state.
Figure 3:
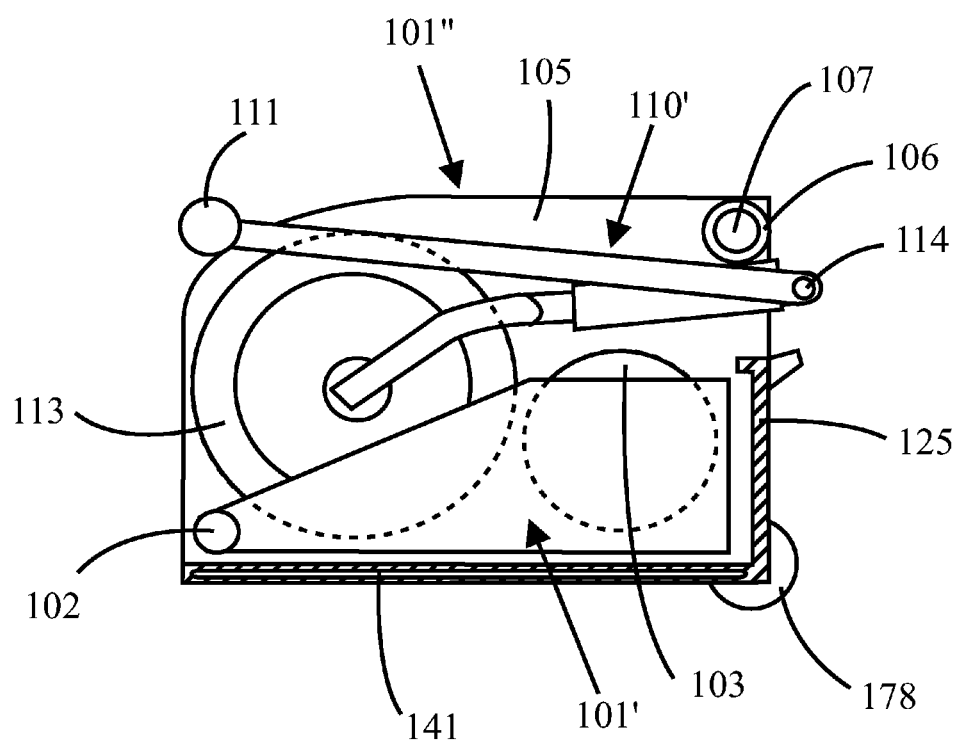
FIG. 3 represents a cut-out side view of the scooter according to the invention in a second, folded state.

The second frame section 101" has at a first face thereof shield walls 105 (FIG. 2), which in the embodiment discussed here are structural parts of the frame section 101". In a second, folded (collapsed) state of the scooter 100 the first frame section 101' and more specifically the rear wheels 103 will be received between said shield walls 105 to avoid soiling by the rear wheels 103 (FIG. 3). The second frame section 101" has a front wall 125, extending from the first face and in the present embodiment a structural part of the second frame section 101".

The scooter 100 also comprises a steering organ 110 (FIGS. 3 and 4) which in turn comprises i) a first steering section 110' comprising a handle bar 111 and two telescopic steering rods 112; and ii) a second steering section 110" provided with one front wheel 113 (FIG. 1). The first steering section 110' and second steering section 110" are joined by a hinge 114. A first locking organ 117 is present to prevent the first steering section 110' from rotating with respect to the second steering section 110" about axis 514 (see FIG. 5) when in the first, unfolded state. The second steering section 110" is hingedly connected to a cross-bar 107 (FIG. 2 and FIG. 5) joining the two shield walls 105, with an axis of rotation 507 (see FIG. 5) of hinge 106 substantially parallel to the axis of rotation of the rear wheels 103 and the hinge 102. More specifically, hinge 106 connects a head set 119 (FIG. 5) of the second steering section 110" to the cross-bar 107. The second steering section 110" is releasably fixed to the second frame section 101", more specifically to the front wall 125, using a second locking organ 120.

To prevent rotation of the second steering section 110" with respect to the second frame section 101", the second locking organ 120 comprises a first casing 122 attached to the head set 119 and a second casing 123 attached to the front wall 125, both casings comprising a hole containing spring 124 for holding a handle 121 in an inserted position, thus locking the hinge 106 as is necessary for the first, unfolded state of the scooter 100. To bring the scooter 100 into the second, folded state shown in FIG. 3, the handle 121 is lifted, removing it from the hole in the second casing 123, and allowing the casings 122, 123 to move relative to each other through rotation about hinge 106.

Figure 8:
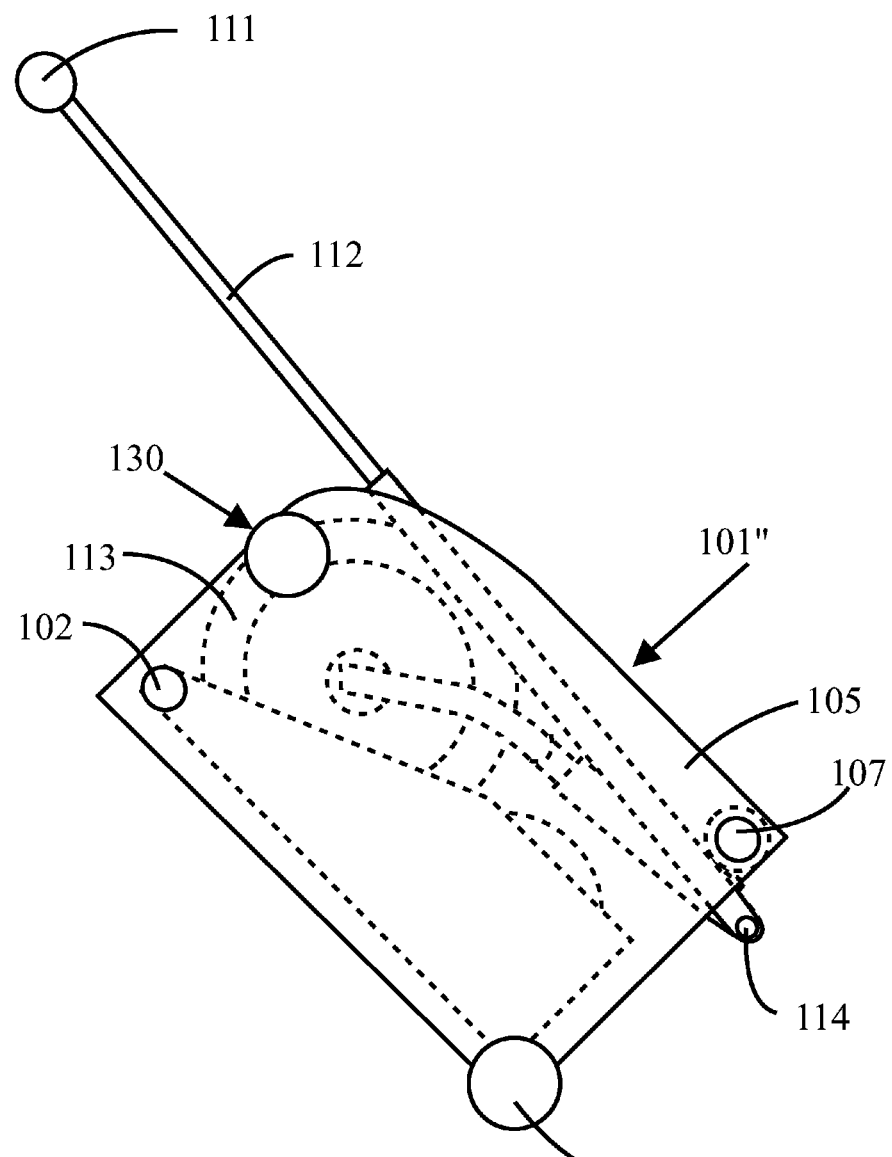
FIG. 8 shows the scooter of FIG. 2 in a state in which it can be easily transported.

In the second, folded state but with the first steering section 110' still extended (as shown in FIG. 8), the scooter 100 can be transported like a trolley/luggage on wheels thanks to auxiliary wheels 178. Generally there will be at least two auxiliary wheels 178, with one at each longitudinal edge of the second frame section 101", for reasons of stability. With the telescopic steering rods 112 in a non-extended state, the scooter 100 is in the second, folded state having a very small volume (FIG. 3). The front and rear wheels 103 and 113 are hidden between the shield walls 105, and they can not easily soil anything. If the scooter 100 is in the second, folded state resting on a shield wall 105, any water dripping from the wheels will be collected in the shield walls 105, especially if these are concave. The second face of the second frame section 101" and/or the outsides of the shield walls 105 may be provided with a non-stick material such as Teflon to reduce the amount of water that may adhere to it.

Figure 4:
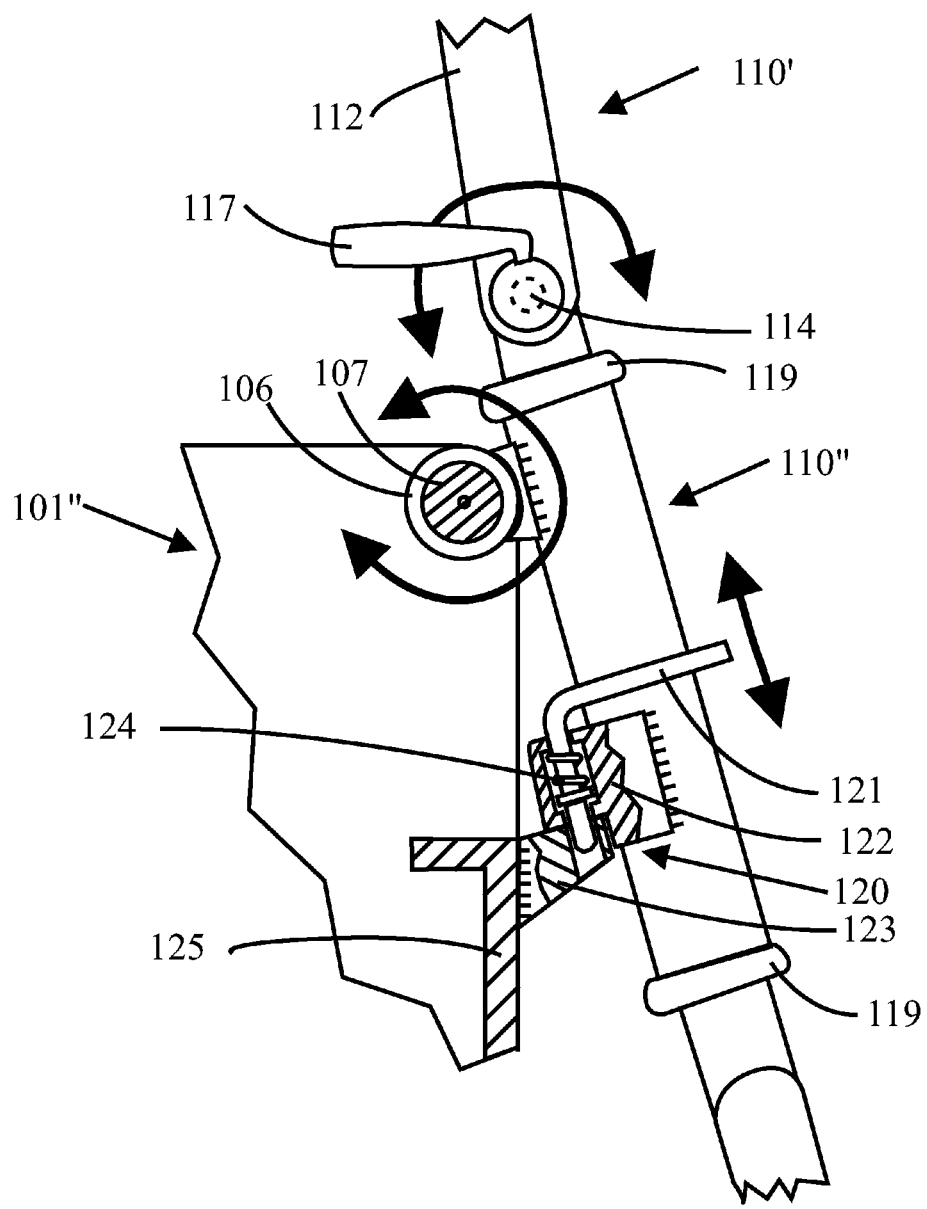
FIG. 4 shows a side view of a detail of a steering organ of the scooter of FIG. 1.
Figure 5:
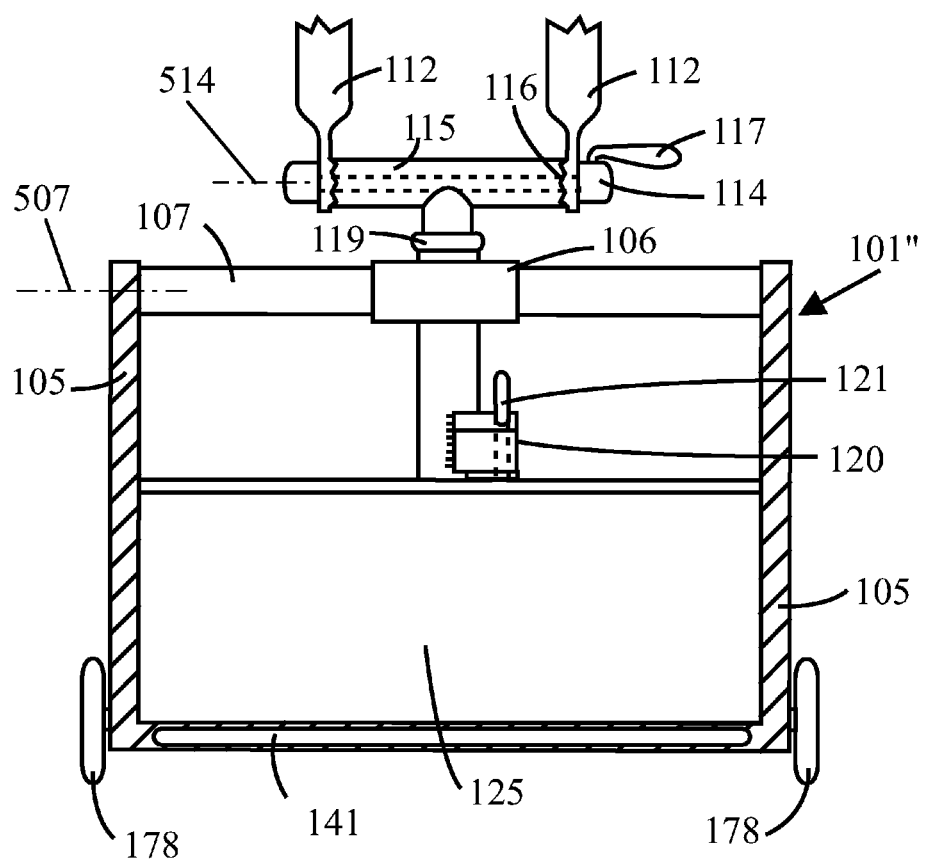
FIG. 5 shows a cross-sectional rear view of the steering organ of the scooter of FIG. 1.

FIG. 4 and FIG. 5 display the steering organ 110 in more detail to illustrate how the various parts can rotate with respect to each other or be locked in position.

Hinge 114 comprises a cross-bar 115 between the two telescopic steering rods 112. Handle 117 is used to lock the hinge 114 when the scooter 100 must be in the first, unfolded state. In the first, unfolded state the first steering section 110' and the second steering section 110" are in line, whereas in the second, folded state of the scooter 100 they are folded back to each other (see FIG. 3). Toothing 116 ensures that the first steering section 110' can not rotate with respect to the second steering section 110" when in the first, unfolded state, improving safety.

Figure 6:
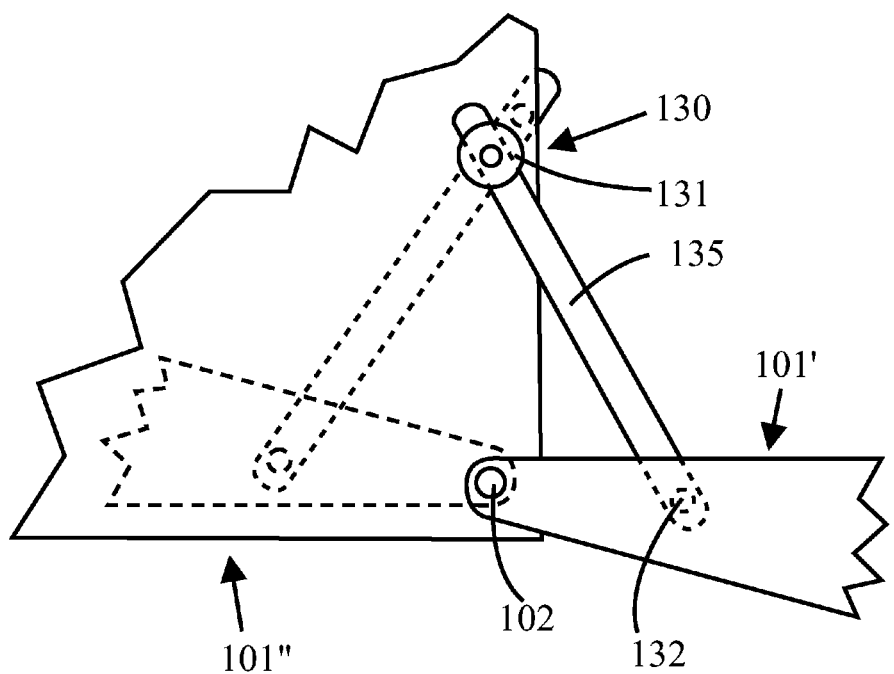
FIG. 6 shows a side view of a detail of the folding mechanism of the scooter of FIG. 1.
Figure 7:
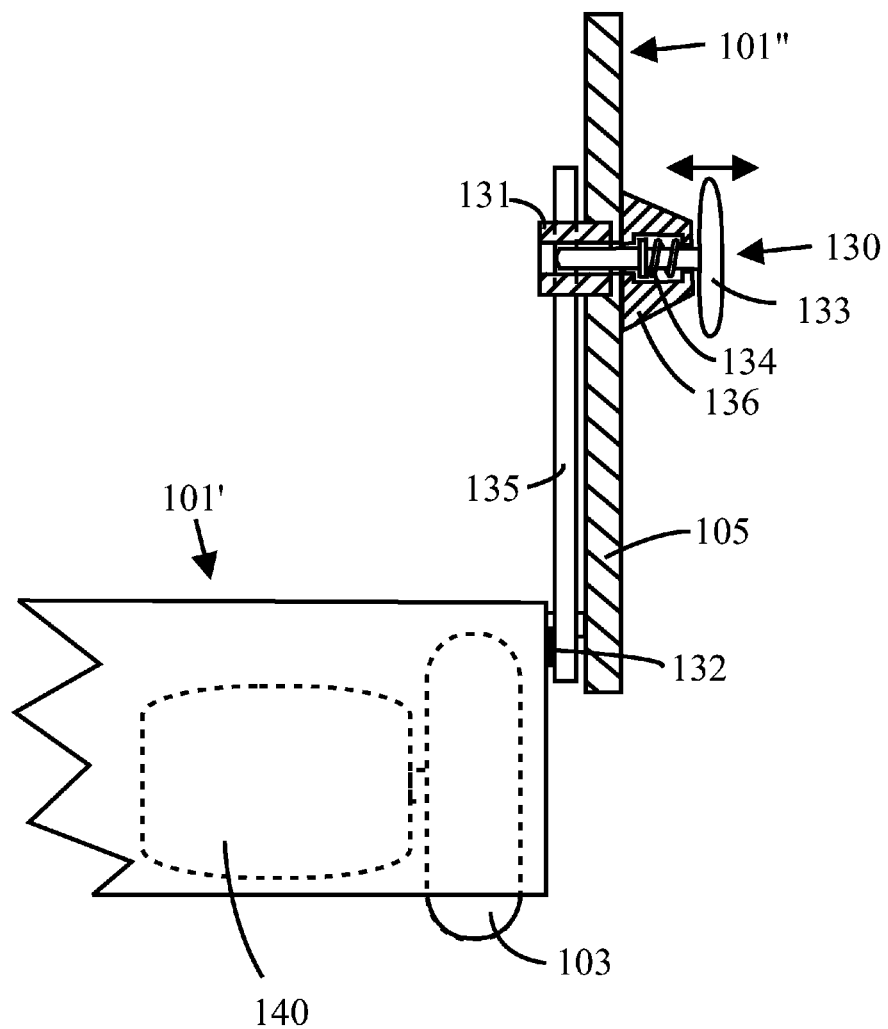
FIG. 7 shows a cross-sectional view of the detail of FIG. 6.

Now reference is made to FIGS. 6 and 7. To prevent movement of the first frame section 101' with respect to the second frame section 101" in the first, unfolded state, a locking mechanism 130 is present comprising a strut 135 having an end that is attached to a hinge 132 at the first frame section 101' so as to allow rotation of the strut 135 with respect to the first frame section 101'. A casing 136 comprising a hole contains a spring 134 for keeping an end of a handle 133 inserted into a hole of a pivot block 131 at the second end of the strut 135 when the scooter 100 is in the first, unfolded state.

To bring the scooter 100 from the first, unfolded state (FIG. 1) to the second, folded state (FIG. 3), the strut 135 is disengaged by pulling handle 133 away from the shield 105, removing the end of the handle 133 from the hole in the pivot block 131 against the force exerted by spring 134. Then the first frame section 101' is brought with its first face in a position facing the first face of the second frame section 101". The locking organs 117 and 120 are set to unlock, and the second steering section 110" and the front wheel 113 are rotated about the axis of rotation 507 such that the front wheel 113 is between the shield walls 105. The first frame section 101' is preferably locked in place by allowing the end of the handle 133 to be received by the pivot block 131 again, thus locking the first frame section 101' in the second, folded state.

If the first steering section 110' is still extended, the scooter 100 can be transported like a trolley/luggage on wheels thanks to auxiliary wheels 178 (FIG. 8).

The scooter 100 may comprise a motor 140 (FIG. 7) and a battery 141 (FIG. 3) to power it. The present invention can be modified within the scope of the appending claims in many ways. For example, the inside (facing) surfaces of the shield walls 105 may be provided with an absorbing material such as felt to absorb water dripping from the first frame section 101' or front wheel 113. Heat generated in the battery 141 during charging can help to dry the absorbing material, in particular if the battery is integrated in the shield walls 105.

The invention claimed is:

1. Foldable scooter capable of being in a first, unfolded state for transporting a standing rider who can push off of ground to balance and/or propel the scooter and in a second, folded state, the foldable scooter comprising a frame, said frame having a base comprising a first face capable of serving as a footrest for supporting the standing rider thereon and a second face opposite of the first face, at least one rear wheel being provided at said second face of the base for rotating about a rear wheel axis of rotation; the foldable scooter further comprising a steering organ and at least one front wheel attached to the steering organ for rotating about a front wheel axis of rotation, the first face and second face extending generally horizontally when the foldable scooter is in the first, unfolded state and the rear wheel and the front wheel are on horizontal ground, characterized in that the frame comprises a first frame section comprising a first face which provides at least part of the footrest of the base, the first frame section being hingedly connected to a second frame section, the second frame section having a first face from which two longitudinally extending, spaced-apart shield elements extend generally vertically upward therefrom when the foldable scooter is in the first, unfolded state and the rear wheel and the front wheel are on horizontal ground, and the foldable scooter comprises a locking organ for locking the foldable scooter in the first unfolded state, wherein in the second, folded state the first face of the base is folded such that the first face of the first frame section faces the first face of the second frame section with the at least one rear wheel between sides defined by the shield elements, the at least one front wheel being pivotably mounted relative to the second frame section for pivoting about an axis that is parallel to the rear wheel axis of rotation such that the front wheel can be pivoted to a position at least partially between the sides defined by the shield elements.

2. The scooter according to claim 1, wherein the scooter has at least three wheels.

3. The scooter according to claim 2, wherein the number of rear wheels is two, and the number of front wheels is one.

4. The scooter according to claim 1, wherein the front wheel can be pivoted to a position where the front wheel axis of rotation extends between the two shield elements.

5. The scooter according to claim 4, wherein the steering organ comprises a first steering section foldably connected to a second steering section, said second steering section being provided with the at least one front wheel, and a locking organ for fixing the first steering section to the second steering section when the foldable scooter is in the first, unfolded state, an axis of folding at the connection between the first steering section and the second steering section being farther away from the first face of the second frame section than an axis of pivoting for pivoting the front wheel to the second, folded state.

6. The scooter according to claim 1, wherein the scooter comprises an electrical motor for driving at least one rear wheel.

7. The scooter according to claim 1, wherein a face of the second frame section facing away from the first face of the second frame section provided with the shield elements is provided with auxiliary wheels for moving the scooter in the second, folded state.

8. The scooter according to claim 1, wherein in the second, folded state the at least one front wheel is completely between the shield elements.

9. The scooter according to claim 1, wherein the number of rear wheels differs from the number of front wheels and none of the at least one rear wheel is in line with any of the at least one front wheels.

10. The scooter according to claim 1, wherein the steering organ comprises a first steering section and a second steering section, the scooter comprising a second locking organ for releasably fixing the second steering section to the second frame section.

11. The scooter according to claim 1, wherein the steering organ comprises a first steering section and a second steering section connected to the front wheel, the first steering section comprising steering rods joined by a hinge, the front wheel being capable of passing between the steering rods.

12. The scooter according to claim 1, wherein, in the unfolded state, the second frame section is in front of the first frame section.

13. A foldable scooter comprising:
at least one front wheel rotatable about a front wheel axis of rotation;
at least one rear wheel rotatable about a rear wheel axis of rotation;

a frame supported by the front wheel and the rear wheel, the frame comprising a first frame section hingedly connected to a second frame section, and having an unfolded state for transporting a standing rider who can push off of ground to balance and/or propel the scooter and a folded state, the first frame section and the second frame section providing a footrest for supporting the standing rider on a top face thereof when the foldable scooter is in the unfolded state and the rear wheel and the front wheel are on horizontal ground, a steering organ for steering the front wheel;

two longitudinally extending, spaced-apart shield elements which extend generally vertically upward from the second frame section when the foldable scooter is in the unfolded state and the rear wheel and the front wheel are on horizontal ground; and a locking organ for locking the foldable scooter in the unfolded state;

wherein in the folded state the frame is folded such that the top face of the first frame section faces the top face of the second frame section with the at least one rear wheel between sides defined by the shield elements;

the at least one front wheel being pivotably mounted relative to the second frame section for pivoting about a pivot axis that is parallel to the rear wheel axis of rotation such that the front wheel can be pivoted to a position at least partially between the sides defined by the shield elements.

* * * * *